(12) United States Patent
Bikumala et al.

(10) Patent No.: US 12,189,731 B2
(45) Date of Patent: Jan. 7, 2025

(54) METHOD AND SYSTEM FOR AUTHENTICATING USERS WITH A COMBINATION OF BIOMETRICS, HEARTBEAT PATTERN, AND HEART RATE

(71) Applicant: Dell Products L.P., Round Rock, TX (US)

(72) Inventors: Sathish Kumar Bikumala, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 17/155,231

(22) Filed: Jan. 22, 2021

(65) Prior Publication Data
US 2022/0237269 A1 Jul. 28, 2022

(51) Int. Cl.
*G06F 21/00* (2013.01)
*G06F 21/32* (2013.01)
*G06V 40/16* (2022.01)
*G06V 40/70* (2022.01)
*G06V 40/10* (2022.01)
*G06V 40/12* (2022.01)
*G06V 40/18* (2022.01)

(52) U.S. Cl.
CPC ............ *G06F 21/32* (2013.01); *G06V 40/172* (2022.01); *G06V 40/70* (2022.01); *G06F 2221/2117* (2013.01); *G06V 40/1365* (2022.01); *G06V 40/15* (2022.01); *G06V 40/197* (2022.01)

(58) Field of Classification Search
CPC ............ G06F 21/32; G06F 2221/2117; G06V 40/172; G06V 40/70; G06V 40/1365; G06V 40/15; G06V 40/197
See application file for complete search history.

(56) References Cited

U.S. PATENT DOCUMENTS

| | | | | |
|---|---|---|---|---|
| 2006/0193503 | A1* | 8/2006 | Bauchspies | G06V 40/10 382/124 |
| 2014/0159862 | A1* | 6/2014 | Yang | A61B 5/6803 340/5.52 |
| 2017/0353624 | A1* | 12/2017 | Dixit | H04N 1/442 |
| 2020/0186522 | A1* | 6/2020 | Apturkar | H04L 9/3231 |
| 2022/0318352 | A1* | 10/2022 | Gordon | G06F 21/34 |

* cited by examiner

*Primary Examiner* — William A Corum, Jr.
(74) *Attorney, Agent, or Firm* — Terrile, Cannatti & Chambers, LLP; Emmanuel A. Rivera

(57) ABSTRACT

A system, method, and computer-readable medium are disclosed for authentication users to information handling systems. A user's user biometric, heartbeat pattern, and heart rate information are acquired and registered to an information handling system. To access the information handling system, a user's biometric, heartbeat pattern, and heart rate information are acquired and compared to the registered information. Reacquiring and recalibrating is performed for the user biometric, heartbeat pattern, and heart rate information during a session on the information handling system.

14 Claims, 7 Drawing Sheets

METHOD AND SYSTEM FOR AUTHENTICATING USERS WITH A COMBINATION OF BIOMETRICS, HEARTBEAT PATTERN, AND HEART RATE

BACKGROUND OF THE INVENTION

Field of the Invention

The present invention relates to maintenance of computer systems. More specifically, embodiments of the invention relate to authenticating users through biometrics, heartbeat pattern and heart rate to a particular information handling system.

Description of the Related Art

Devices, such as laptop computers, can provide a level of user security through biometric recognition. For example, a user can be authenticated to a device by scanning the user's fingerprint, performing an iris or retinal scan, etc. Biometric recognition can prevent unauthorized users from accessing protected device. Biometric information is received as an input and matched with known or saved user data to confirm the user. Unlike passcodes, biometric information is inherently not transferrable between users. A user's unique biometric information, such as a fingerprint or iris (retina), is inherent to a user.

Although biometric recognition can provide a great level of security, there may be times when a user is forced to present their biometric information against their will. For example, if a party intent on accessing a device or system accessible only through the biometric information that can only be provided by a particular user, the party may force that user to present their fingerprint, iris (retina), etc., to access the device or system. Current biometric recognition solutions may not account for these instances of forced intrusion of the user.

SUMMARY OF THE INVENTION

A system, method, and computer-readable medium are disclosed for authentication users to information handling systems. A user's user biometric, heartbeat pattern, and heart rate information are acquired and registered to an information handling system. To access the information handling system, a user's biometric, heartbeat pattern, and heart rate information are acquired and compared to the registered information. Reacquiring and recalibrating is performed for the user biometric, heartbeat pattern, and heart rate information during a session on the information handling system

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

Figure 1:
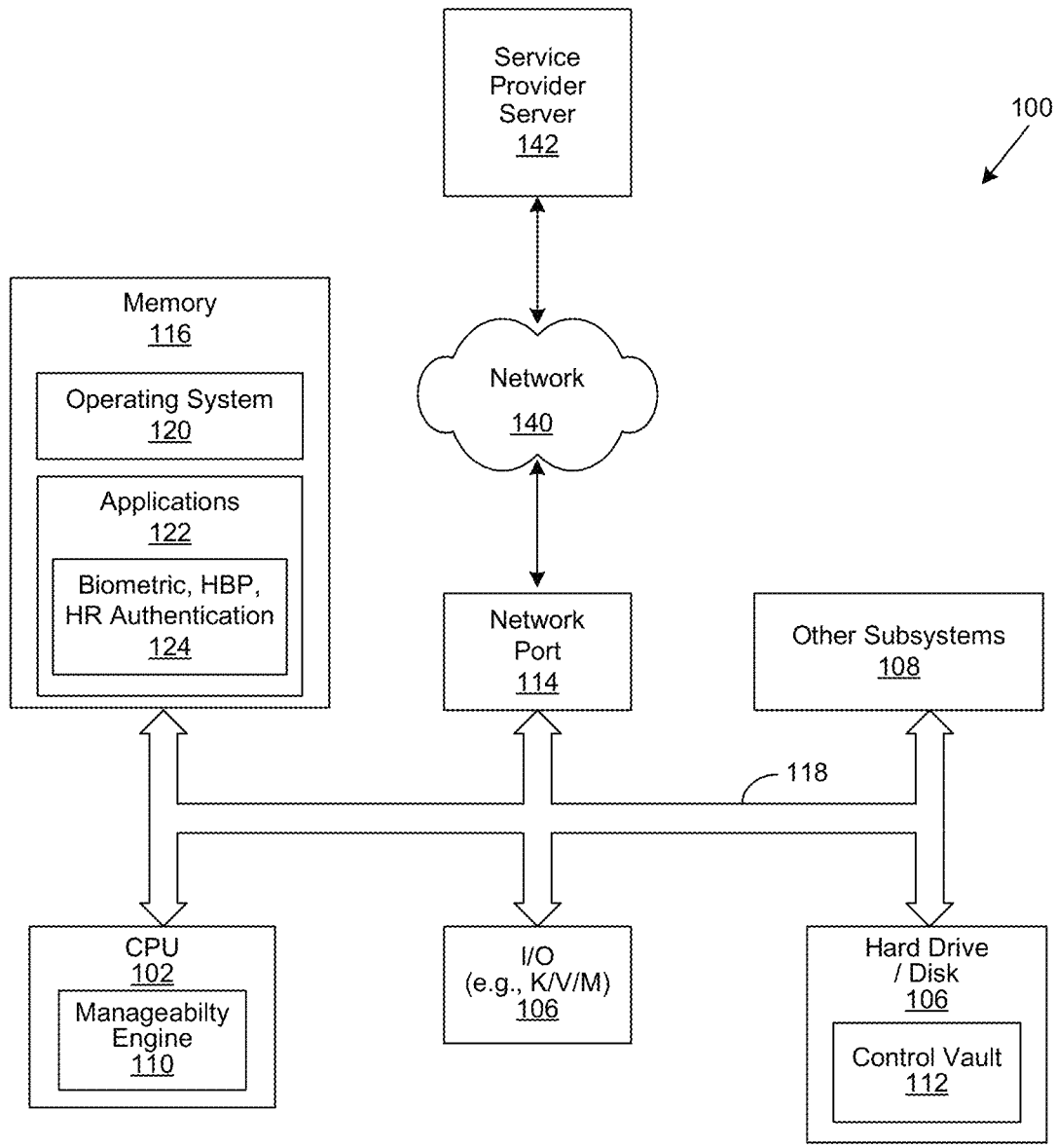
FIG. 1 depicts a general illustration of a computing system as implemented in the system and method of the present invention.

A system, method, and computer readable medium are disclosed for authenticating users to a particular information handling system (i.e., device) through their biometric information, heartbeat pattern and heart rate. In certain implementations, the information handling system is accessed through a combination of a user's unique biometric information and regular or normalized heartbeat pattern and heart rate information.

Individuals can have a unique heartbeat pattern, as well as a range of normal heart rate. During instances when an individual is place in conditions of stress or danger, that heart rate can change and increase. In certain implementations, the normal heart rate, including a user's normalized heartbeat pattern are recorded and associated with a device or system. The recording can take place during an initial biometric service enrollment and referred to later during user authentication process. The implementation of the user's normalized heartbeat pattern and heart rate is used along with along with biometric information recognition.

During user authentication, if the user's heartbeat pattern and heart rate has abnormally deviated from the recorded normalized heartbeat pattern and heart rate range, the user is not granted access to the device. Various implementations of biometric recognition can be provided. For example, an implementation can be provided using a fingerprint reader. A fingerprint reader can be combined with a heart rate monitor. When a user presents his or her finger to the fingerprint reader, the user's heartbeat pattern and heart rate can also be detected and recorded. Implementations with ultrasound fingerprint technology can provide for a fingerprint and heart rate to be acquired with a single sensor.

Implementations can provide for an iris (retina) scan on a device, including augmented reality/virtual reality (AR/VR) devices. User facing cameras can be implemented on devices in order to perform an iris (retina) scan. Implementations can provide for heartbeat pattern and heart rate of the user to be concurrently recorded along with the iris (retina) scan.

Acquiring heartbeat pattern and heart rate of the user can be implemented using various methods, including a dedicated heart rate monitor on the device, a heart rate monitor attached to the device that is connected to the user (e.g., contact with user temple area), a user facing camera that monitors veins of a retina of the user, an infrared camera (IR) that monitors heat variation and heartbeat of the user, etc. When user biometric information is taken, user heartbeat pattern and heart rate can also be taken and considered when granting device access.

If the acquired heartbeat pattern and heart rate abnormally deviate from the recorded heartbeat pattern and heart rate, or if no heartbeat pattern or heart rate is acquired, access is not granted, even if biometric information is acquired and verified to match a user. In certain implementations, an alert can be provided to an administrator(s), security, etc., if multiple failed access attempts take place. Implementations can also provide for monitoring or occasionally polling/accessing a user's heartbeat pattern and heat rate, and possibly locking out a user if an abnormal increase or sudden decrease in heart rate is detected. An increase in heart rate can correlate to a stress or threat condition and a decrease in heart rate can correlate to non-use of the device or a serious medical condition occurring with the user.

For purposes of this disclosure, a device or an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates an information handling system 100 that can be used to implement the system and method of the present invention. The information handling system 100 includes one or more processors (e.g., central processor unit or "CPU," embedded controller, etc.) 102, input/output (I/O) devices 104, such as a display, a keyboard, a mouse, and associated controllers, a hard drive or disk storage 106, and various other subsystems 108. Other subsystems 108 can include sensors (fingerprint reader, iris (retina) scanner, heartbeat monitor, etc.).

Implementations can provide for the one or more processors (e.g., CPU) 102 to include a dedicated manageability engine 110 that can be used in matching acquired biometric information, heartbeat pattern, and heart rate with stored verified related data. Certain implementations provide for hard drive or disk storage 106 to include a secure control vault 112 with verified related data, particularly user biometric information, heartbeat pattern and heart rate information. In various embodiments, the information handling system 100 also includes network port 114 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 116, which is interconnected to the foregoing via one or more buses 118. Examples of buses 118 include I2C, USB, etc. System memory 116 further includes an operating system (OS) 120 and applications 122. In certain embodiments, applications 118 are provided as a service from the service provider server 142. Implementations can provide for applications 122 to include a biometric, heartbeat, heartrate authentication application 124.

Figure 2:
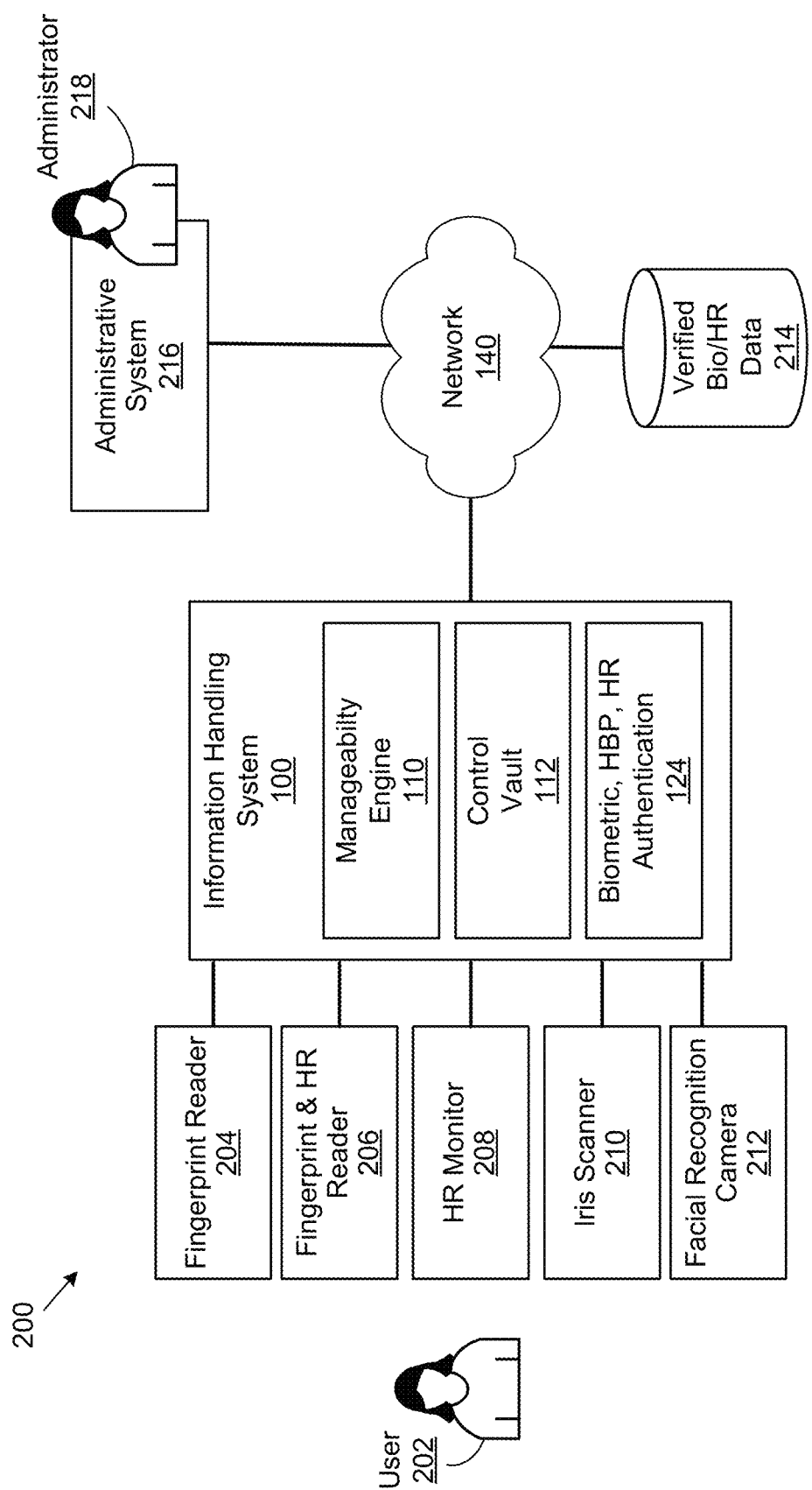
FIG. 2 depicts a system for system for authenticating users to a particular information handling system biometric information, heartbeat pattern and heart rate.

FIG. 2 is a simplified block diagram of a system for authenticating users to a particular information handling system biometric information, heartbeat pattern and heart rate. The system 200 includes the information handing system 100 as described above in reference to FIG. 1. As discussed, various implementations provide for the information handling system includes manageability engine 110, control vault 112 and a biometric, heartbeat, heartrate authentication application 124. The heartrate authentication application 124 can be used to initiate and perform the methods described herein. Information handling system 100 is connected to network 140 as described above in reference to FIG. 1.

The information handling system 100 can be accessed by a user 202. Various embodiments provide for the information handling system 100 to include or be configured with a fingerprint reader 204, a fingerprint and heart rate reader 206, a heart rate monitor 208, an iris (retina) scanner 210, and a facial recognition camera 212, which are used to acquire user 202 biometric information, heartbeat pattern and heart rate as described herein. It is to be understood that the described elements can be combined and other such biometric, heartbeat and heat rate acquiring elements (i.e., devices) can be implemented.

It is to be understood that various implementations of biometric recognition can be provided. For example, an implementation can be provided using a fingerprint reader 204. A fingerprint reader can be combined with a heart rate reader or monitor, such as a fingerprint and heart rate reader 206. When the user 202 presents his or her finger to the fingerprint reader 204 or fingerprint and heart rate reader 206, the user 202 heartbeat pattern and heart rate can also be detected and recorded. Implementations with ultrasound fingerprint technology can provide for a fingerprint and heart rate to be acquired with a single sensor.

Implementations can provide for an iris (retina) scan on a device, which can be provided through iris (retina) scanner 210. In various implementations, the information handling system 100 can be a configured as an augmented reality/virtual reality (AR/VR) device, where the iris (retina) scanner 210 as part of the AR/VR device.

In certain implementations, iris (retina) scanner 210 can be implemented to perform concurrent iris (retina) scan and heart rate monitoring of the user 202. Therefore, it is to be understood that acquiring heartbeat pattern and heart rate of the user can be implemented using various methods, including a dedicated heart rate monitor 208, a heart rate monitor 208 attached to the information handling system 100 (i.e., device) connected to the user 202 (e.g., contact with user 202 temple area), iris (retina) scanner 210 that monitors veins of a retina of the user, an infrared camera (IR) (not shown) that monitors heat variation and heartbeat of the user, etc. Biometric information of the user 202 can also include varying facial expressions of the user 202 that indicate a particular condition, including a stressful condition. The facial recognition camera 212 can record and monitor such facial expressions of the user 202.

When user 202 biometric information is taken, user heartbeat pattern and heart rate can also be taken and considered when granting device access. As discussed, the user 202 can have a unique heartbeat pattern, as well as a range of normal heart rate. Various implementations can provide acquiring the normal heart rate, including a normalized heartbeat pattern and recording and associating with a device such as information handling system 100. The recording can take place during an initial biometric service enrollment and referred to later during user authentication process. User 202 recorded and verified biometric information, heartbeat pattern and heart rate can be stored in a verified biometric, heartbeat pattern and heart rate data store 214. In addition, verified data can also be stored in control vault 112.

Various implementations provide for system 200 to include an administrative system 216 that is accessible by an administrator 218. The administrative system 216 can be configured to monitor access to the information handling system 100, including monitoring access and use by user 202. In certain implementations, an alert can be provided to an administrator 216, where administrator can be part of security, etc., if multiple failed access attempts take place. Implementations can also provide for monitoring or occasionally polling/accessing a user 202 heartbeat pattern and heat rate, and possibly locking out the user 202 if an abnormal increase or sudden decrease in heart rate is detected. An increase in heart rate can correlate to a stress or threat condition and a decrease in heart rate can correlate to non-use of the device or a serious medical condition occurring with the user 202.

Figure 3:
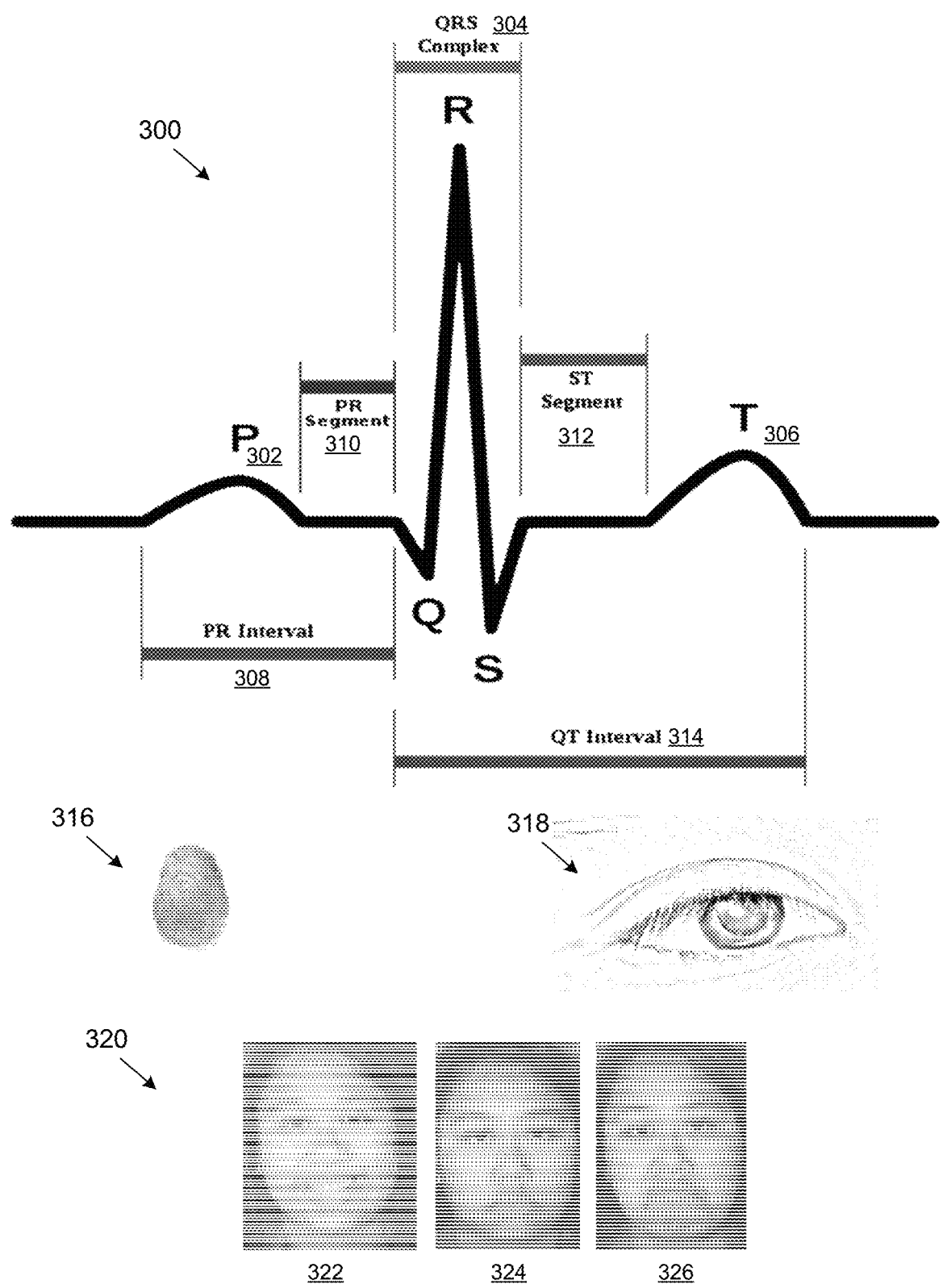
FIG. 3 shows biometric information, heartbeat pattern, and heart rate

FIG. 3 shows biometric information, heartbeat pattern, and heart rate. A heartbeat pattern 300 is acquired by the elements described in FIG. 2 (e.g., fingerprint and HR reader 206, HR monitor 208, iris (retina) scanner 210). The heartbeat pattern 300 can include waves having patterns that are unique to an individual (i.e., user 202). The waves can include a P wave 302, a QRS complex 304, a T wave 306, and a U wave (not shown). The P wave 302 represents atrial depolarization. The QRS complex 304 represents ventricular depolarization. The T wave 306 represents ventricular repolarization. The U wave (not shown) represents papillary muscle repolarization. Changes in the structure of the heart and its surroundings (including blood composition) change the pattern of the waves. PR interval 308 is measured from the beginning of the P wave 302 to the beginning of the QRS complex 304. The PR segment 310 represents the time delay between atrial and ventricular activation. The ST segment 312 connects the QRS complex 304 and the T wave 306 and represents the period when the ventricles are depolarized. The QT interval 314 is measured from the beginning of the QRS complex 304 to the end of the T wave 306. Waves have a period or cycle. Therefore user 202 heartbeat pattern and heart rate that is normalized has particular range of period or cycles.

Fingerprint image 316 is biometric fingerprint information that can be acquired using fingerprint reader 204, fingerprint and HR reader 206 described in reference to FIG. 2. Iris or retinal image 318 is biometric iris (retina) information that can be acquired using iris (retina) scanner 210 described in reference to FIG. 2. For various implementations, facial recognition camera 212 described in reference to FIG. 2 captures facial images 320 of user 202. A facial image can correspond to a particular condition of the user 202. For example, image 322 can indicate a "happy" emotional condition of user 202, image 324 a "neutral" emotional condition of user 202, and image 326 can indicate a "stressed" condition of user 202. For various implementations, facial recognition can further provide additional security in allowing access of information handling system 100 to user 202. For example, if a facial image 326 is acquired showing "stressed condition" of user 202, access to the information handling system 100 can be denied. Facial image recognition and correlation to particular conditions can be provided in or included in biometric, heartbeat, heartrate authentication application 124, provided through service provider server 142, or other service that matches known facial images to particular conditions.

Figure 4:
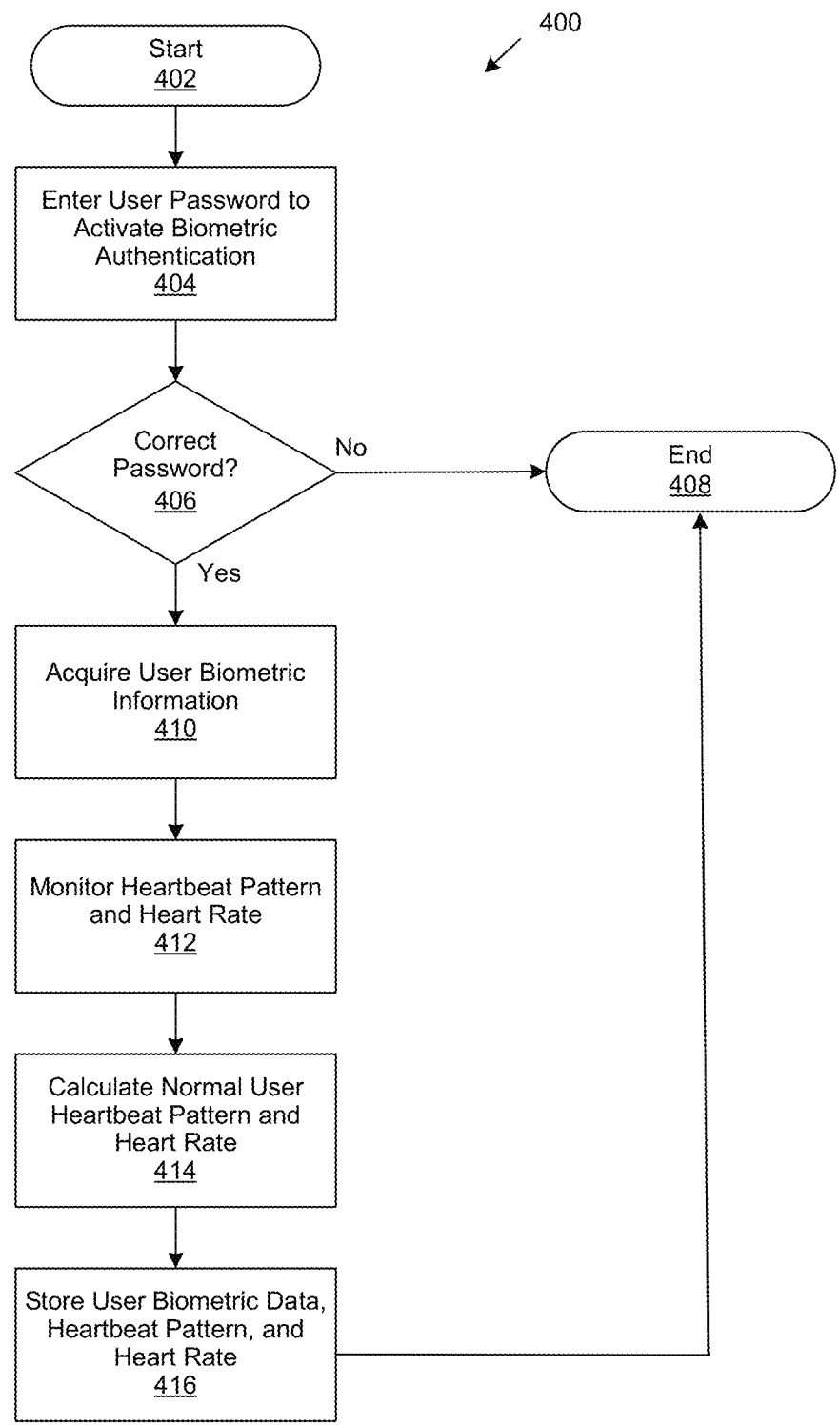
FIG. 4 shows a flowchart for acquiring and setting user biometric information, heartbeat pattern, and heart rate.

FIG. 4 is a generalized flowchart 400 for acquiring and setting user biometric information, heartbeat pattern, and heart rate. In particular, the process 400 can be used to perform an initial acquisition or calibrating of a user 202 normalized biometric information, heartbeat pattern and heart rate. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, a user enters a "password" on an information handling system 100 or device. The password provides an initial access to the information handling system 100 and activates biometric authentication, including registering or setting a normalized biometric information (e.g., fingerprint, iris), heartbeat pattern, heart rate of user 202. At step 406, a determination is made if the entered password is correct.

If the password is not correct, following the "No" branch of step 406, at step 408, the process ends. If the password correct, following the "Yes" branch of step 406, at step 410, acquiring initial biometric information (data) is performed. The biometric information can include fingerprints, iris (retina), and in certain implementations facial images. In various implementations, a fingerprint reader 204, a fingerprint and heart rate reader 206, an iris (retina) scanner 210, and a facial recognition camera 212 can be used to acquire the biometric information. The biometric information is associated with normalized heartbeat pattern and heart rate of the user 202.

At step 412, heartbeat pattern and heart rate are monitored. As discussed, this can be performed using devices or elements described above in reference to FIG. 2, for example fingerprint and HR reader 206, HR monitor 208, iris (retina) scanner 210.

At step 414, the monitored normalized heartbeat pattern and heart rate are calculated. This normalized heartbeat pattern and heart rate are used to verify the user 202 for future access to the information handling system 100.

At step 416, the normalized user 202 normalized biometric information heartbeat pattern, heart rate of user 202 are registered or stored. In various implementations, the registering or storing can be performed at the control vault 102 and/or verified biometric, heartbeat pattern and heart rate data store 214. At step 408, the process 400 ends.

Figure 5:
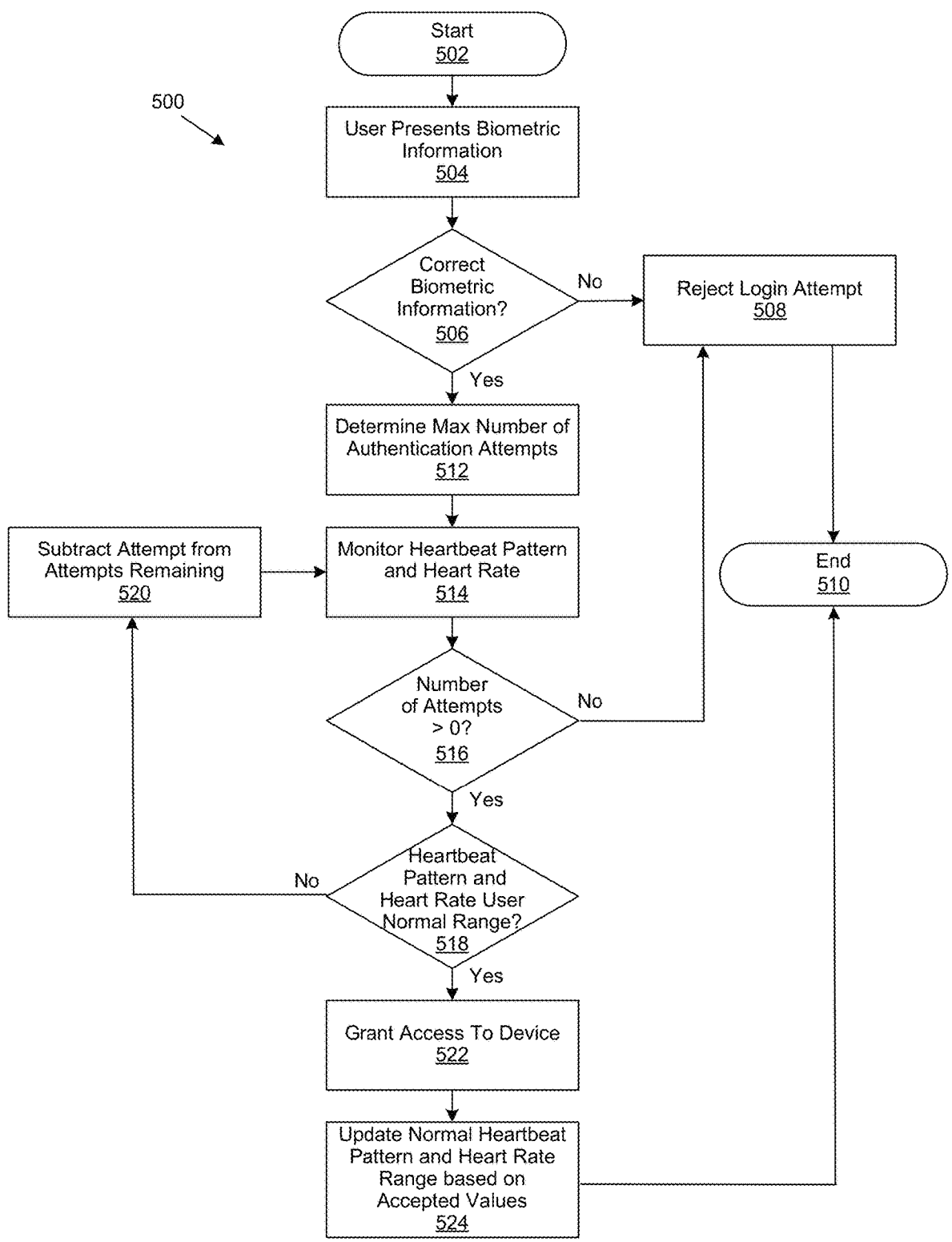
FIG. 5 shows a flow chart for reacquiring and resetting user biometric information, heartbeat pattern, and heart rate.

FIG. 5 is a generalized flowchart 500 for reacquiring and resetting user biometric information, heartbeat pattern, and heart rate. In particular, the process 400 can be used to perform a reacquisition or recalibrating of a user 202 normalized biometric information, heartbeat pattern and heart rate. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, a user 202 presents biometric information. In various implementations, a fingerprint reader 204, a fingerprint and heart rate reader 206, an iris (retina) scanner 210, and a facial recognition camera 212 can be used to acquire the biometric information.

At step 506, a determination is made if the presented biometric information is correct as compared to stored and verified user 202 biometric information. If the biometric information is incorrect, following the "No" branch of step 506, at step 508, the login attempt is rejected. At step 510, the process 500 ends.

If the biometric information is correct, following the "Yes" branch of step 506, at step 512, a determination is made as to a number of maximum authentication attempts can be made by user 202. The number of authentication attempts can be predetermined. In certain implementations, the number is set by an administrative system 216 (administrator 218). At step 514, monitoring heartbeat pattern and heart rate is performed. For example, step 514 can be performed by fingerprint and HR reader 206, HR monitor 208, iris (retina) scanner 210.

At step 516, a determination is made if the number of attempts is greater than zero. If the number of attempts is not greater than zero, following the "No" branch of step of step 516, at step 508, the login attempt is rejected. At step 510, the process 500 ends.

If the number of attempts is greater than zero, then following the "Yes" branch of step of step 516, at step 518, a determination is made if the acquired heartbeat pattern and heart rate are within the normal range of the verified user 202 heartbeat pattern and heart rate. If the acquired heartbeat pattern and heart rate are not within the normal range of the verified user 202, following the "No" branch of step 518, at step 520 an attempt is subtracted from the remaining attempts, and step 514 follows.

If the acquired heartbeat pattern and heart rate are within the normal range of the verified user 202, following the "Yes" branch of step 518, at step 522, access is granted to the information handling system or device. At step 524, normalized heartbeat pattern and heart rate range can be updated based on the acquired accepted values. At step 510 the process ends.

Figure 6:
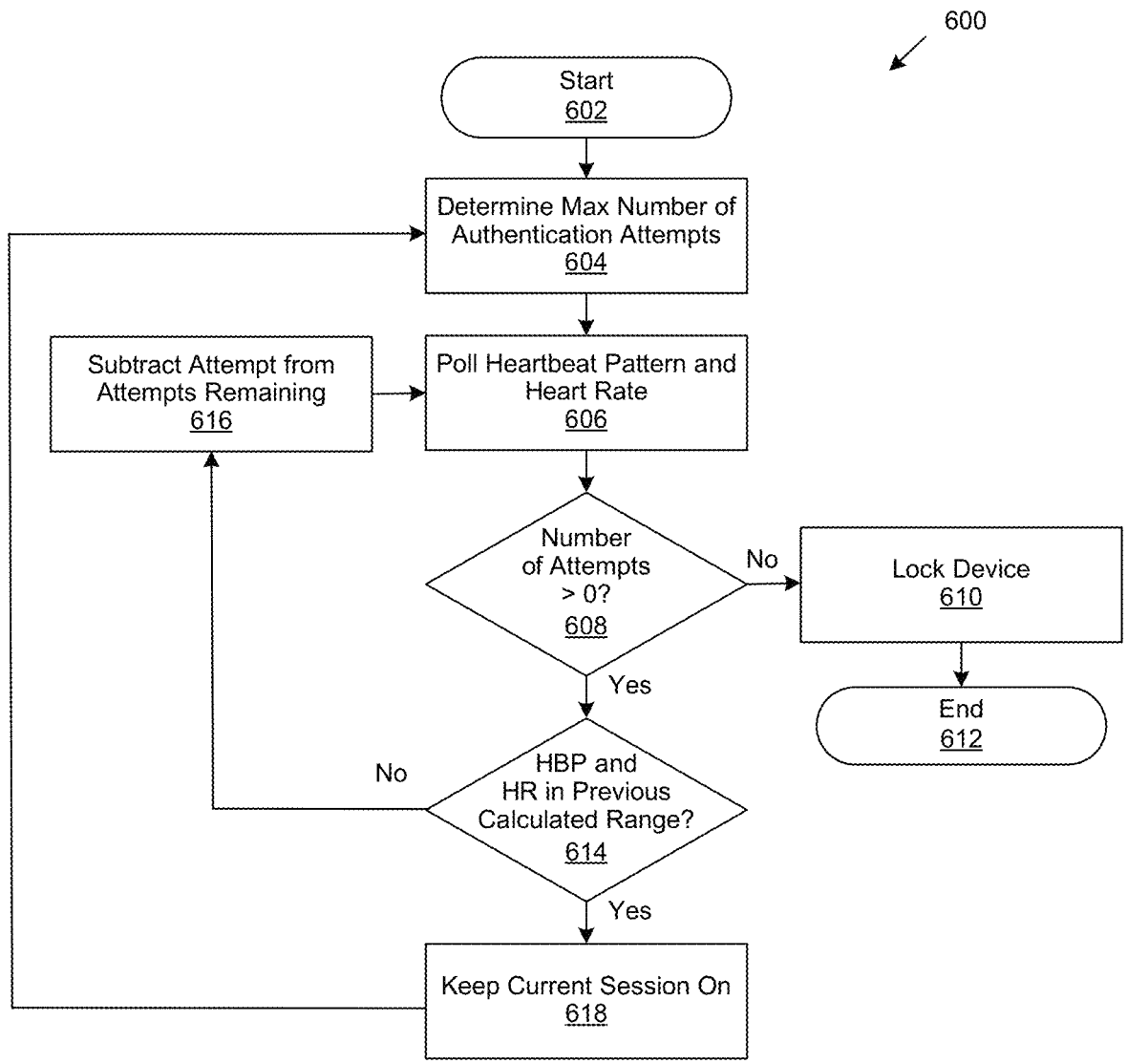
FIG. 6 shows a flow chart for keeping the user security session on by continuously confirming normalized heartbeat pattern and heart rate.

FIG. 6 is a generalized flowchart 600 for keeping the user security session on by continuously confirming normalized heartbeat pattern and heart rate. In particular, the process 600 can be used to continuously update security during session of a user 202, and to log off the user 202 if anomalies are determined. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, a determination is made as to a number of maximum authentication attempts can be made by user 202. The number of authentication attempts can be predetermined. In certain implementations, the number is set by an administrative system 216 (administrator 218).

At step 606, a poll is performed as to the user heartbeat pattern and heart rate. Polling can be performed at a predetermine interval, where heartbeat pattern and heart rate are acquired. Heartbeat pattern and heart rate can be acquired by fingerprint and HR reader 206, HR monitor 208, iris (retina) scanner 210.

At step 608, a determination is made if the number of attempts is greater than zero. If the number of attempts is not greater than zero, following the "No" branch of step of step 608, at step 610, the user 202 is locked out or no longer provided access to the information handling system or device. At step 612, the process 600 ends.

If the number of attempts is greater than zero, then following the "Yes" branch of step of step 608, at step 614, a determination is made if the acquired heartbeat pattern and heart rate are within the normal range of the verified user 202 heartbeat pattern and heart rate as monitored and calculated. If the acquired heartbeat pattern and heart rate are not within the normal range of the verified user 202, following the "No" branch of step 614, at step 616 an attempt is subtracted from the remaining attempts, and step 606 follows.

If the acquired heartbeat pattern and heart rate are within the normal range of the verified user 202, following the "Yes" branch of step 614, at step 618, the current session is kept on (continues), and step 604 follows.

Figure 7:
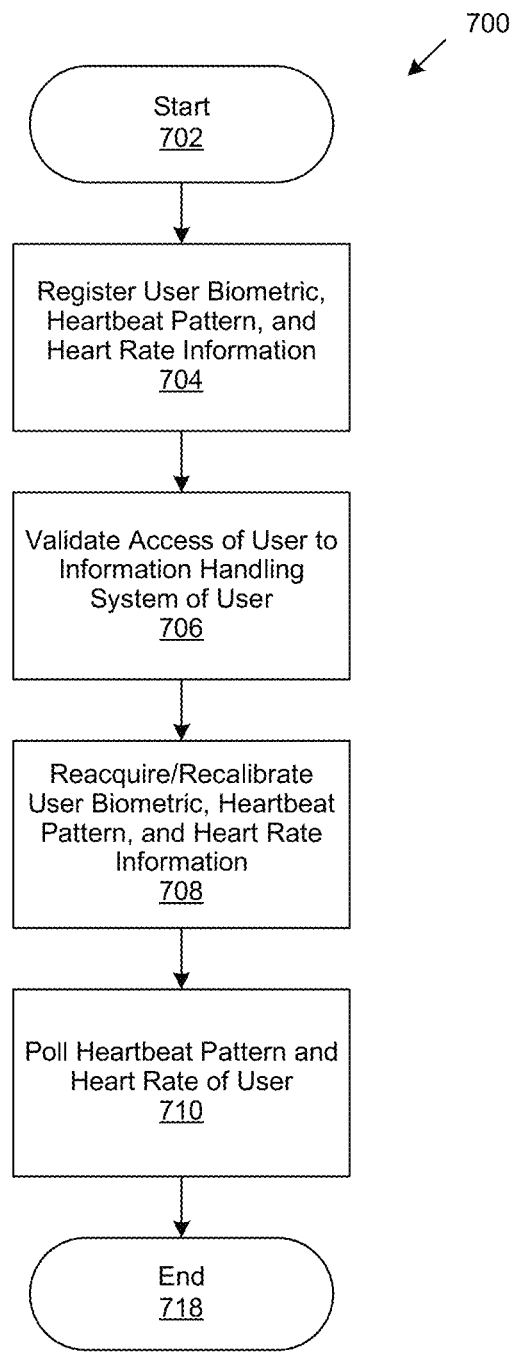
FIG. 7 shows a flow chart for authenticating users through biometrics, heartbeat pattern, and heart rate to a particular information handling system.

FIG. 7 is a generalized flowchart 700 for authenticating users through biometrics, heartbeat pattern, and heart rate to a particular information handling system. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, registering or setting up user 202 biometric, heart beat pattern, and heart rate information is performed. For example, the steps as described in process 400 can be implemented.

At step 706, validating access to an information handling system (HIS) is performed to user 202. For example, the steps as described in process 500 can be implemented.

At step 708, reacquiring and/or recalibrating of user biometric, heartbeat pattern, and heart rate information is performed. For example, the steps as described in process 500 can be implemented.

At step 710, polling of heartbeat pattern and heart rate of user 202 is performed. For example, the steps as described in process 600 can be implemented.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as JAVA, SMALLTALK, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method of authenticating users to information handling systems comprising:
    registering user biometric information, user heartbeat pattern information, and user heart rate information to an information handling system, wherein the user heartbeat pattern includes waves having patterns that are unique to an individual, the waves include a P wave, a QRS complex wave, a T wave, and a U wave;
    validating access of the user to the information handling system by acquiring user biometric information, user heartbeat pattern information, and user heart rate information and comparing each of the acquired user biometric information, user heartbeat pattern information and user heart rate information to the respective registered user biometric information, registered user heartbeat pattern information, and registered user heart rate information, wherein the user biometric information includes facial image corresponding to the user, wherein the validating is based on recognizing an emotional condition of the facial image, and denying access if a stressed condition is recognized;
    reacquiring and revalidating the user biometric information, user heartbeat pattern information, and user heart rate information during a session on the information handling system, wherein the validating, and reacquiring and revalidating are performed over a set number of attempts; and
    reporting to an administrator if multiple failed attempts have occurred or if an abnormal increase or decrease in the user heartbeat heart rate information occurs.

2. The method of claim 1, wherein the user biometric information comprises fingerprint and/or iris information of the user.

3. The method of claim 1, wherein the user biometric information, user heartbeat pattern information, and user heart rate information are normalized to the user.

4. The method of claim 1, wherein the registering and validating are performed by devices on the information handling system.

5. The method of claim 1 further comprising polling the user heartbeat pattern information and the user heart rate information and logging out the user if no user heartbeat pattern information or user heart rate information is detected.

6. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
    registering user biometric information, user heartbeat pattern information, and user heart rate information to an information handling system, wherein the user heartbeat pattern includes waves having patterns that are unique to an individual, the waves include a P wave, a QRS complex wave, a T wave, and a U wave;

validating access of the user to the information handling system by acquiring user biometric information, user heartbeat pattern information, and user heart rate information and comparing each of the acquired user biometric information, user heartbeat pattern information and user heart rate information to the respective registered user biometric information, registered user heartbeat pattern information, and registered user heart rate information, wherein the user biometric information includes facial image corresponding to the user, wherein the validating is based on recognizing an emotional condition of the facial image, and denying access if a stressed condition is recognized;

reacquiring and revalidating the user biometric information, user heartbeat pattern information, and user heart rate information during a session on the information handling system, wherein the validating, and reacquiring and revalidating are performed over a set number of attempts; and reporting to an administrator if multiple failed attempts have occurred or if an abnormal increase or decrease in the user heart rate information occurs.

7. The system of claim 6, wherein the user biometric information comprises fingerprint and/or iris information of the user.

8. The system of claim 6, wherein the user biometric information, user heartbeat pattern information, and user heart rate information are normalized to the user.

9. The system of claim 6, wherein the registering and validating are performed by devices on the information handling system.

10. The system of claim 6 further comprising polling the user heartbeat pattern information and the user heart rate information and logging out the user if no user heartbeat pattern information or user heart rate information is detected.

11. A non-transitory, computer-readable storage medium embodying computer program code, the computer program code comprising computer executable instructions configured to:

registering user biometric information, user heartbeat pattern information, and user heart rate information to an information handling system, wherein the user heartbeat pattern includes waves having patterns that are unique to an individual, the waves include a P wave, a QRS complex wave, a T wave, and a U wave;

validating access of the user to the information handling system by acquiring user biometric information, user heartbeat pattern information, and user heart rate information and comparing each of the acquired user biometric information, user heartbeat pattern information and user heart rate information to the respective registered user biometric information, registered user heartbeat pattern information, and registered user heart rate information, wherein the user biometric information includes facial image corresponding to the user, wherein the validating is based on recognizing an emotional condition of the facial image, and denying access if a stressed condition is recognized;

reacquiring and revalidating the user biometric information, user heartbeat pattern information, and user heart rate information during a session on the information handling system, wherein the validating, and reacquiring and revalidating are performed over a set number of attempts; and reporting to an administrator if multiple failed attempts have occurred or if an abnormal increase or decrease in the user heart rate information occurs.

12. The non-transitory, computer-readable storage medium of claim 11, wherein the user biometric information comprises fingerprint and/or iris information of the user.

13. The non-transitory, computer-readable storage medium of claim 11, wherein the user biometric information is normalized to the user.

14. The non-transitory, computer-readable storage medium of claim 11 further comprising polling the user heartbeat pattern information and the user heart rate information and logging out the user if no user heartbeat pattern information or user heart rate information is detected.

* * * * *